(12) United States Patent
Alberth, Jr. et al.

(10) Patent No.: US 7,466,679 B2
(45) Date of Patent: Dec. 16, 2008

(54) METHOD AND SYSTEM FOR MAINTAINING REGISTRATION INFORMATION FOR MULTIPLE COMMUNICATION AREAS

(75) Inventors: William P. Alberth, Jr., Crystal Lake, IL (US); Samuel J. Liggett, Encinitas, CA (US); William E. Welnick, Poway, CA (US)

(73) Assignee: Motorola, Inc., Libertyville, IL (US)

( * ) Notice: Subject to any disclaimer, the term of this patent is extended or adjusted under 35 U.S.C. 154(b) by 0 days.

(21) Appl. No.: 10/749,819

(22) Filed: Dec. 31, 2003

(65) Prior Publication Data

US 2005/0148330 A1    Jul. 7, 2005

(51) Int. Cl.
    *H04Q 7/00* (2006.01)
(52) U.S. Cl. ...................................... 370/331
(58) Field of Classification Search ............... 370/203, 370/204, 310–314, 328, 331, 335, 338, 342–350; 455/415, 422–427, 435–444
See application file for complete search history.

(56) References Cited

U.S. PATENT DOCUMENTS

| 4,876,738 | A | * | 10/1989 | Selby | 455/435.1 |
|---|---|---|---|---|---|
| 5,101,500 | A | * | 3/1992 | Marui | 340/7.42 |
| 5,890,062 | A | * | 3/1999 | Courtney et al. | 455/428 |
| 5,898,923 | A | * | 4/1999 | Gaasvik et al. | 455/434 |
| 6,542,716 | B1 | * | 4/2003 | Dent et al. | 455/13.1 |
| 6,560,239 | B1 | * | 5/2003 | Frid et al. | 370/426 |
| 6,628,935 | B1 | * | 9/2003 | Lawrence | 455/412.1 |
| 6,708,031 | B2 | * | 3/2004 | Purnadi et al. | 455/436 |
| 6,922,561 | B2 | * | 7/2005 | Chen et al. | 455/435.1 |

OTHER PUBLICATIONS

3GPP2; 3$^{rd}$ Generation Partnership Project 2 "3GPP2"; "Data Service Options for Spread Spectrum Systems Addendum 2"; 3GPP2 C.S0017-0-2; Version 2.0; Aug. 21, 2000; 136 pages.

* cited by examiner

*Primary Examiner*—Dmitry Levitan
(74) *Attorney, Agent, or Firm*—Lawrence J. Chapa

(57) ABSTRACT

A method and system for maintaining registration information for multiple communication areas within a network is provided. For a particular mobile subscriber, information associated with at least some prior registrations are retained, and in some instances are re-used upon re-entry into a communication area in which the mobile subscriber was previously located. The retention of registration information for multiple communication areas is managed as the default, without requiring additional signaling associated with each registration.

19 Claims, 4 Drawing Sheets

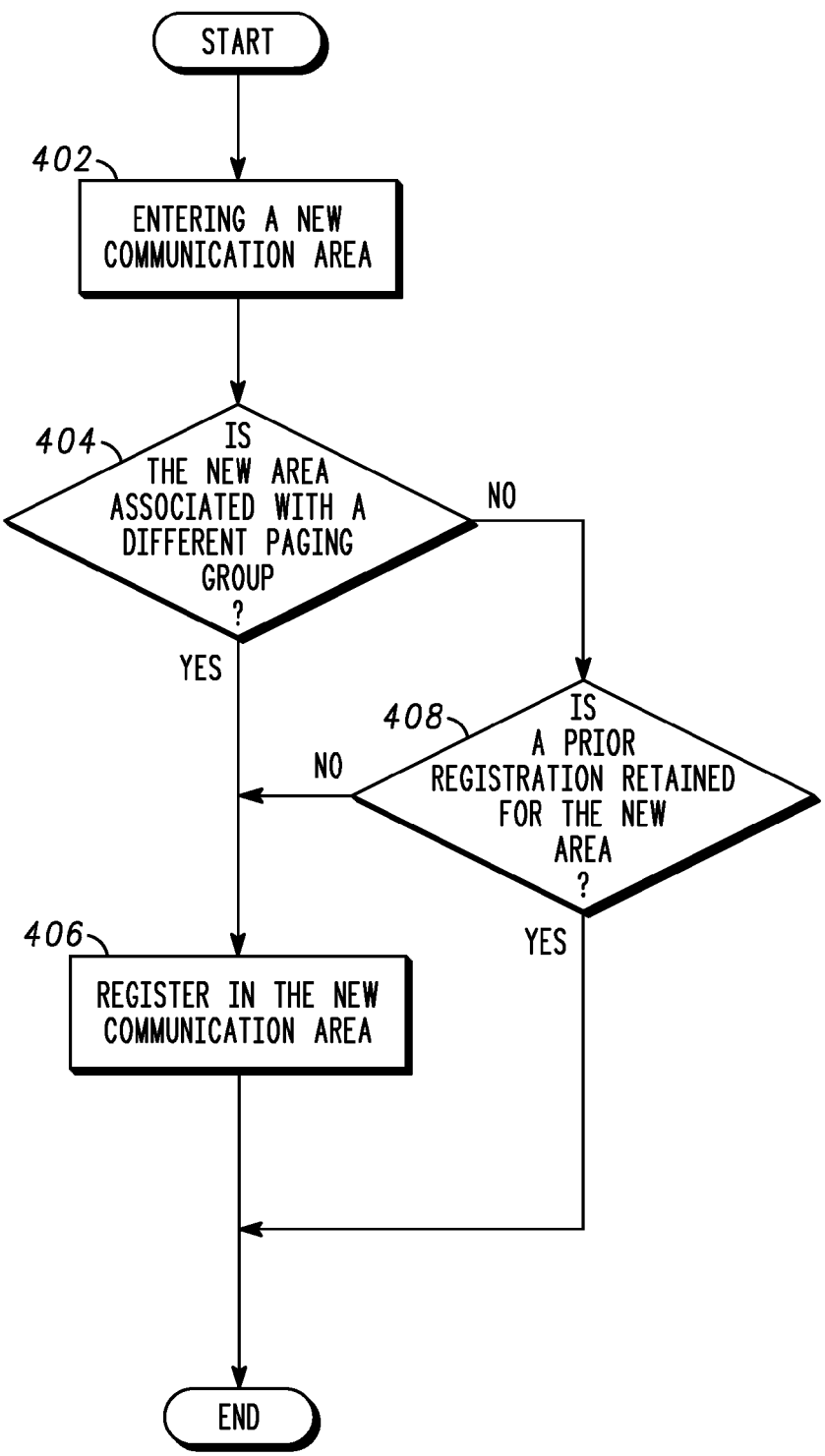

METHOD AND SYSTEM FOR MAINTAINING REGISTRATION INFORMATION FOR MULTIPLE COMMUNICATION AREAS

FIELD OF THE INVENTION

The present invention relates generally to the management of registration information of a mobile subscriber relative to one or more communication areas, and more particularly, to maintaining, simultaneously, the registration information for a plurality of different communication areas within a network.

BACKGROUND OF THE INVENTION

Mobile subscribers register with a network as a way of informing the network of the presence of a mobile subscriber in different communication areas within a network. When a mobile subscriber registers with the network, the mobile subscriber communicates with one or more base stations, which are each responsible for communications within a predesignated area, often referred to as a cell. A particular base station will generally only be able to communicate with a mobile subscriber, if the mobile subscriber is proximate to the area, that the base station is associated with. Consequently, an ability to communicate with a base station will often help identify the proximate location of a mobile subscriber, relative to a network.

By identifying the proximate location of a mobile subscriber, and/or identifying the base stations, which are capable of communicating with a mobile subscriber, when a call or message is received for a mobile subscriber, the network is better able to establish the necessary supporting communication links. The on-going performance of registrations at various time intervals, which are often associated with a change of power state or movement of a mobile subscriber between different communication areas, allows the network to maintain current information relative to a particular mobile subscriber.

Generally, a mobile subscriber will maintain a single registration, which is consistent with its present location relative to one or more communication areas, such as a packet zone ID. As the mobile subscriber moves into an area corresponding to a different packet zone ID, the mobile subscriber will register with the new area, and as part of the process will terminate or tear down any prior registrations. When a mobile subscriber is proximate a border region between two different areas, this can result in frequent registrations by the mobile subscriber, especially if the mobile subscriber moves back and forth across the border.

Frequent registrations can sometimes result in a couple of negative consequences, insofaras that each time that a registration occurs, a mobile subscriber may be momentarily unavailable to receive incoming messages and/or calls. Furthermore, the period of unavailability, while the mobile subscriber is registering with a new area, can sometimes last several seconds. This can sometimes constitute an unacceptable delay, for example, where a user may be engaged in a push-to-talk call, in which a more immediate response is expected. In addition to the mobile subscriber being unavailable to receive calls and/or messages, the additional communication activities associated with the registration process may also have an impact on battery life. Consequently, it would be beneficial to reduce the need for subsequent registrations.

In some systems, it is possible to maintain multiple registrations, but the default is to maintain only a single registration. In order to support the maintenance of multiple registrations, additional signaling and/or specific instructions is generally required, above and beyond the signaling associated with regular communications, which also generally must be repeated in connection with each subsequent registration.

The present inventors have recognized that in at least some instances, it may be beneficial to be able to retain earlier registration information, that could be used upon subsequent re-entry into an area in which the mobile subscriber was previously located and with which the mobile subscriber had previously been registered with. Furthermore, it would be beneficial to retain the earlier registration information without requiring additional messages and/or signaling associated with each registration.

SUMMARY OF THE INVENTION

The present invention provides a method of maintaining registration information for a plurality of different communication areas within a network. The method includes registering in a first communication area, where the wireless communication unit is located. The wireless communication unit then moves into a second communication area, which is different than the first communication area, and registers in the second communication area, while retaining at least the most recent prior registration associated with a previous communication area. The default operating mode includes retaining at least the two most recent area registrations.

In at least one embodiment, when the wireless communication unit moves back into the first communication area, the wireless communication unit does not register in the first communication area, when the registration from the user's prior presence in the first communication area is still retained.

In at least a further embodiment, when the wireless communication unit moves into a third communication area, which is different from the first and the second communication areas, the wireless communication unit registers in the third communication area, while retaining the registration from at least the previous area within which the user was most recently located.

The present invention further provides a wireless communication device. The wireless communication device includes a transceiver adapted for communicating with a network, a processor coupled to the transceiver, and a storage element coupled to the processor and adapted for retaining registration information for a plurality of areas. The processor includes an area detection module, which is adapted for detecting the area in which the wireless communication device is located, and a registration module, which is adapted for registering the wireless communication device with the network.

These and other features, and advantages of this invention are evident from the following description of one or more preferred embodiments of this invention, with reference to the accompanying drawings.

BRIEF DESCRIPTION OF THE DRAWINGS

FIG. 6 is a flow diagram of a method associated with determining if the device should register with the network upon entering a new area.

DETAILED DESCRIPTION OF THE PREFERRED EMBODIMENT(S)

Figure 1:
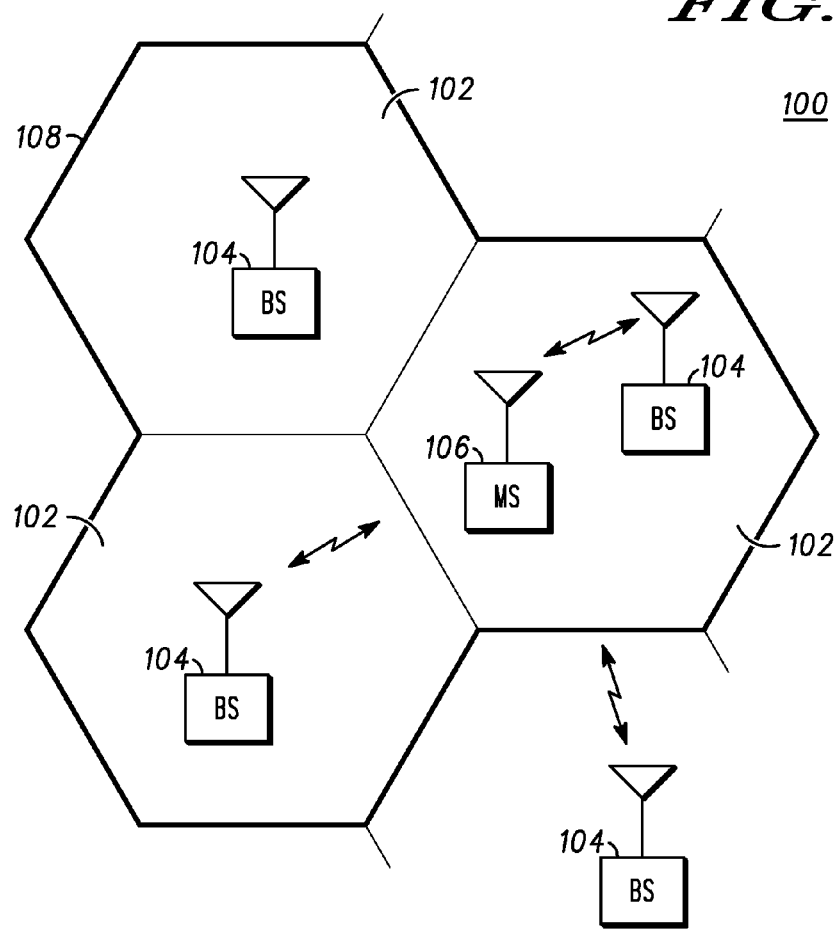
FIG. 1 is an exemplary topographical view of a geographical region representing a portion of the coverage area for a wireless communication system.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary topographical view 100 of at least a portion of a wireless communication system. The topographical view 100 includes a plurality of cells 102 pictorially represented as hexagons. The hexagons are only rough approximations, where in reality the area of transmission for each of the cells 102 is not so uniformly defined. Each cell 102 is typically served by one or more base stations (BS) 104, referred to as a serving station, which communicates with mobile stations (MS) 106 traveling within the corresponding cell 102. Multiple base stations 104 and corresponding cells 102 can be grouped together and commonly referenced by a single packet zone identification. In the illustrated embodiment, three such cells are shown as belonging to a common packet zone identification 108, which is illustrated by a thicker boundary line.

Typically, when a mobile station 106 enters a new packet zone identification area, including when the mobile station is initially activated (i.e. changes power states), the mobile station 106 will register with the network or communication system. As a mobile station 106 moves throughout the system, the mobile station 106 may move away from a base station, which is currently serving the mobile station 106, toward a base station, which is not presently serving the mobile station. In conjunction therewith, as the mobile station moves away from the serving base station 104 the signals that are communicated between the two become weaker. Conversely, as a mobile station 106 moves toward another base station 104 the signal strength of the communication signal transmitted between the two will typically become stronger.

As a mobile station 106 transitions across a cell boundary between two base stations 104, it will become desirable to transfer control of the continued communication to the base station 104 associated with the cell 102, that the mobile station is entering into. The same is generally true relative to the more broadly defined communication areas, such as packet zone identification areas 108. In connection with entering into a packet zone identification area 108, this can involve registering with the new communication area. Registrations are used to help update routing information relative to information communicated between the mobile station 106 and the wireless communication system. However, if a mobile station moves proximate a packet zone identification boundary for any length of time, a mobile station can sometimes frequently change back and forth between multiple packet zone identification areas, which in some instances might each require a registration with the new packet zone identification area.

Figure 2:
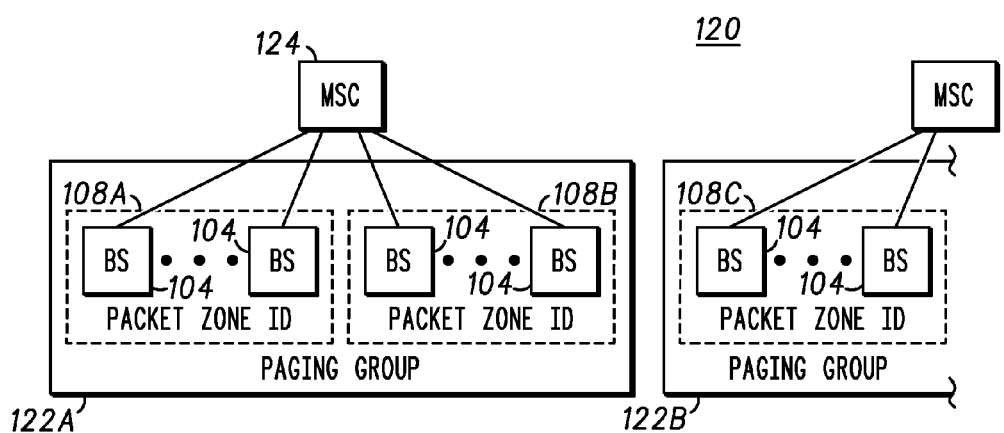
FIG. 2 is a block diagram of a portion of an exemplary network illustrating portion of multiple paging groups and packet zone identification areas, relative to a plurality of base stations.

FIG. 2 illustrates a block diagram of a portion of an exemplary network 120 illustrating different communication areas including multiple packet zone identification areas 108A-C, relative to a plurality of base stations 104, as well as multiple paging groups 122A-B, which refers to a still further set of different communication areas. The paging groups, generally correspond to one or more base stations 104, which can commonly broadcast certain types of paging and messaging information. Packet zone identifications are generally used for designating different areas in which packet data can be routed. Often times, a paging group will include multiple packet zone identifications. The base stations of a paging group are also typically associated with a common mobile switching center 124.

In connection with the present invention, the mobile station 106 will maintain registration information for a plurality of different communication areas, such as packet zone identification areas, which in at least some instances may minimize the number of necessary registrations. More specifically, in at least one embodiment, transitions between packet zone identification areas within a common paging group would not require a new registration if a registration was already established and was being presently maintained by the mobile station. This is possible, in at least some instances, because a communication system will generally broadcast an initial communication to the mobile station across a paging group, such that even if the mobile subscriber is in a different packet zone identification area, as long as the mobile subscriber is located in the same paging group, relative to the mobile subscriber's last registration, the mobile subscriber will still receive the message. Consequently, not updating the communication system relative to the particular packet zone identification area that a mobile station is presently located, in these circumstances, will generally not present a problem.

However, in the case of a transition between packet zone identifications that also involve a transition between paging groups, a registration may be necessary, in at least some instances, in order to insure that the communication system knows, which paging group the mobile station 106 is located for purposes of routing an initial message. For example, a different location involving a different paging group, may require that the page or message be forwarded to the mobile subscriber through a different mobile switching center 124 and corresponding base stations 104.

Figure 3:
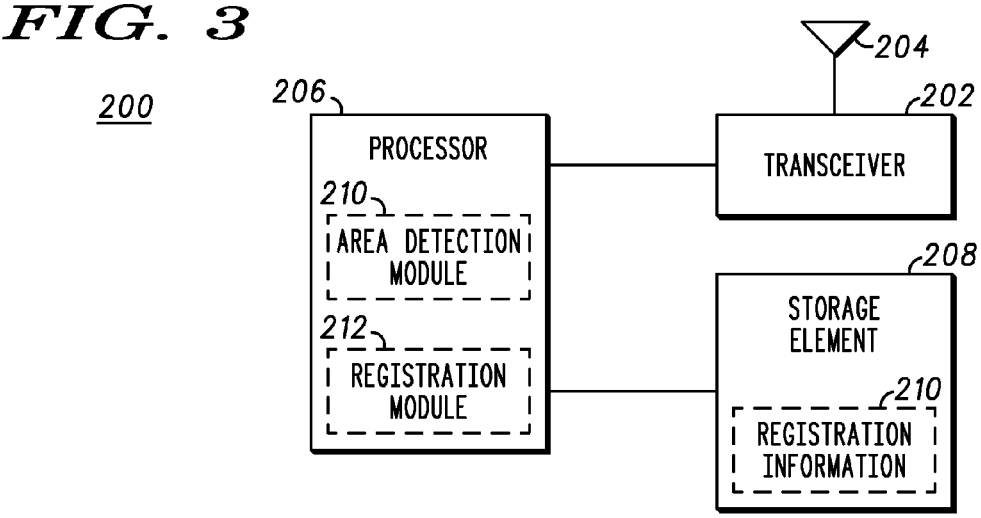
FIG. 3 is a block diagram of a wireless communication device, in accordance with at least one embodiment of the present invention.

FIG. 3 illustrates a block diagram of a wireless communication device 200, in accordance with at least one embodiment of the present invention, which in at least some instances can correspond to the mobile subscriber 106 illustrated in FIG. 1. Alternatively, or more specifically, the wireless communication device 200 could correspond to a cell phone, a radiotelephone, or a cordless telephone. Still further the wireless communication device could correspond to paging devices, personal digital assistants, portable computers, pen-based or keyboard-based handheld devices, remote control units, audio players (such as an MP3 player) and the like. One skilled in the art will readily recognize that the wireless communication device could correspond to still further types of devices equipped to communicate wirelessly without departing from the teachings of the present invention.

In the illustrated embodiment, the wireless communication device 200 includes a transceiver 202, which is adapted for communicating with a network, such as a wireless communication system, and an antenna 204 coupled to the transceiver 202. The wireless communication device 200 additionally includes a processor 206 coupled to the transceiver 202, and a storage element 208 coupled to the processor 206.

The processor 206 includes an area detection module 210, which is adapted for detecting the area in which the wireless communication device 200 is located. The processor 206 further includes a registration module 212, which is adapted for registering the wireless communication device 200 with the network.

Figure 4:
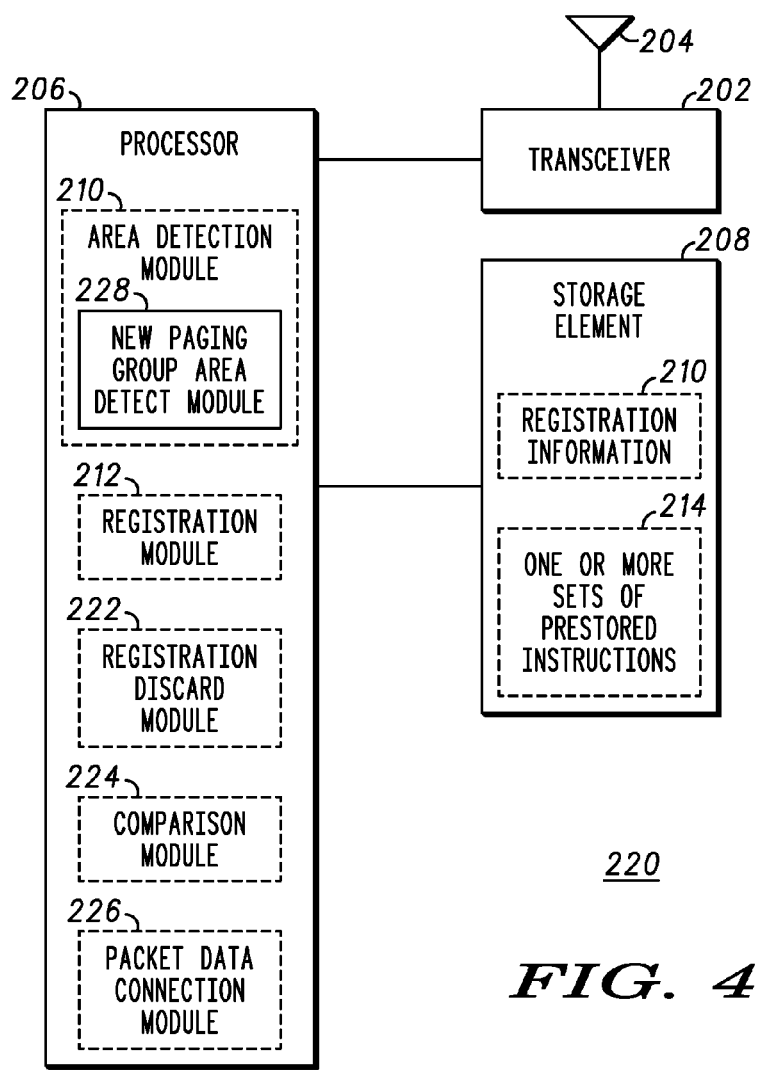
FIG. 4 is a more specific block diagram of a wireless communication device, in accordance with at least a further embodiment of the present invention.

In at least one embodiment, the processor 206 can be implemented in the form of a microprocessor. Still further, the area detection module 210 and the registration module 212 could be implemented in the form of one or more sets of prestored instructions 214, which as illustrated in FIG. 4 could be stored in the storage element 208.

The storage element 208 can take the form of one or more different types of storage including both volatile and non-volatile memory, at least a couple of examples including one or more types of semi-conductor memories (i.e. ROM, EPROM, RAM or EEPROM, etc.). Still further, the different types of storage could include some form of auxiliary storage, such as fixed or removable media including magnetic disk or optical disc drives. The storage element is generally adapted for retaining registration information 210 for a plurality of areas. In at least one embodiment, the storage element 208 could be integrated as part of the processor 206 FIG. 4 illustrates a more specific block diagram of a wireless communication device 220, in accordance with at least a further embodiment of the present invention. The wireless communication device 220 illustrated in FIG. 4 shares several similar elements with the wireless communication device 200 illustrated in FIG. 3. Where similar elements exist, common reference numbers have been used, and the previously described functionality is generally the same.

The processor 206 of wireless communication device 220 additionally includes a registration discard module 222, a comparison module 224, and a packet data connection module 226. The area detection module 210 additionally includes a new paging group area detect module 228.

The registration discard module 222 facilitates discarding registrations that are associated with areas in which the wireless communication device 220 was least recently located. For example, in at least one embodiment, the wireless communication device retains the registration information for two different communication areas, the current communication area, and the immediately preceding communication area, all other registration information would be discarded. This would allow the wireless communication device 220 to be located proximate a border between two different communication areas, in which the communication device 220 could stray back and forth across the border several times, while still minimizing the number of necessary registrations. The registration discard module 222, in at least some embodiments, is further adapted to discard any stored registration information, when the wireless communication device 220 changes power states, or in other words powers up or powers down.

The comparison module 224 facilitates comparing the area in which the wireless communication device 220 is located with the area associated with the registration information 210, which is retained within the storage element 208, wherein if a registration associated with the current location of the wireless communication device 220 is not retained in the storage element 208, then a control signal is produced, which is adapted for initiating a registration by the registration module 212.

The packet data connection module 226 facilitates establishing a packet data connection with the network, which in turn could be used to support a packet data voice connection, via a packet data voice module.

The new paging group area detect module 228 facilitates detecting the wireless communication device 220 entering a new paging group area. If the wireless communication device 220 is detected as entering a new paging group area, the paging group area detect module 228 produces a control signal adapted for initiating a registration by the registration module 212, even if registration information from a prior presence in the new area is retained.

Similar to the area detection module 210 and the registration module 212 noted above, the registration discard module 222, comparison module 224, and packet data connection module 226, in at least one or more embodiments, could be implemented as one or more sets of prestored instructions, stored in the storage element 208 and executed by the processor 206.

Figure 5:
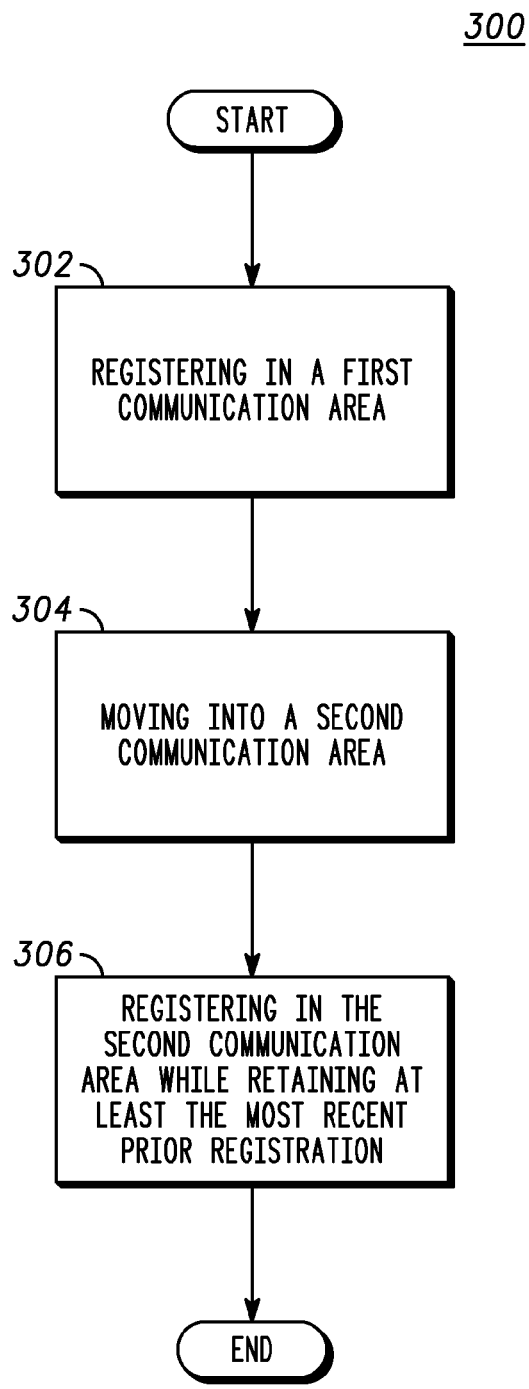
FIG. 5 is a flow diagram of a method for maintaining registration information for a plurality of different communication areas, in accordance with at least one embodiment of the present invention.

FIG. 5 illustrates a flow diagram 300 of a method for maintaining registration information for a plurality of different communication areas, in accordance with at least one embodiment of the present invention. The method includes the wireless communication unit 220 initially registering 302 in a first communication area. When the communication unit 220 moves 304 into a second communication area, the communication unit 220 registers 306 in the second communication area, while retaining at least the most recent prior registration. Generally, this occurs automatically as part of a default operating mode.

As noted previously, in this way, the communication unit 220 could move back into the first communication area, and because the registration information for the first communication area was retained, the communication unit 220 would not need to re-register. However, if the communication unit 220 were to enter a third area, then the communication unit might discard the registration information associated with a previously located area in which the communication unit was least recently located, and retain the previously located area in which the communication unit was most recently located.

FIG. 6 illustrates a flow diagram 400 of a method associated with determining if the device should register with the network upon entering a new area. Upon entering 402 a new area, the communication unit 220 determines 404 whether the new area is associated with a different paging group. If the new area is a different paging group, the communication unit 220 registers 406 in the new communication area. If the new area is not a different paging group, a determination 408 is then made as to whether a prior registration has been retained for the new area. If a prior registration has not been retained, the communication unit 220 registers 406 in the new communication area.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of maintaining registration information for a plurality of different communication areas associated with a respective one of a plurality of paging groups within a network comprising:
   registering in a first communication area, where the wireless communication unit is located;
   moving into a second communication area, which is different than the first communication area;

registering in the second communication area, while retaining at least the most recent prior registration associated with a previous communication area, wherein the default operating mode includes retaining at least the two most recent area registrations; and wherein, upon entering a new communication area, determining if the new area is associated with a different paging group from the paging group associated with the immediately prior communication area, and if the new area is associated with a different paging group, registering in the new communication area regardless as to whether a registration from a prior presence in the new communication area is still retained.

2. A method in accordance with claim 1 wherein each communication area is associated with a different packet zone identification.

3. A method in accordance with claim 1 farther comprising moving back into the first communication area, without registering in the first communication area, when the registration from the user's prior presence in the first communication area is still retained.

4. A method in accordance with claim 1 further comprising moving into a third communication area and registering in the third communication area, which is different from the first and the second communication areas, while retaining the registration from at least the previous area within which the user was most recently located.

5. A method in accordance with claim 4 farther comprising discarding any registrations not associated with the present communication area and the most recent previous communication area.

6. A method in accordance with claim 4 further comprising discarding the registration associated with the least recent previous communication area.

7. A method in accordance with claim 1 wherein a registration supports a packet data communication in the associated communication area.

8. A method in accordance with claim 1 wherein retaining a registration associated with a previous communication area occurs automatically in absence of specific instructions.

9. A method in accordance with claim 8 wherein retaining a registration associated with a previous communication area occurs automatically in absence of a service option control message, which overrides a default value associated with the number of registrations to retain.

10. A method of maintaining registration information for a plurality of different communication areas within a network, at least some of the areas being associated with different paging groups, the method comprising:

registering in a first communication area, where the wireless communication unit is located;

moving into a second communication area, which is different than the first communication area;

registering in the second communication area, while retaining at least the most recent prior registration associated with a previous communication area, wherein the default operating mode includes retaining at least the two most recent area registrations; and wherein, upon changing power states including powering up and powering down, any previously stored registrations are discarded.

11. A wireless communication device comprising:
a transceiver adapted for communicating with a network;
a processor coupled to the transceiver, the processor including
an area detection module adapted for detecting the area in which the wireless communication device is located, where the area is one of a plurality of areas associated with a respective one of a plurality of paging groups, said area detection module including a new paging group area detect module adapted for detecting the wireless communication device entering a new paging group area, wherein if the wireless communication device enters an area associated with a new paging group, then producing a control signal adapted for initiating a registration by the registration module regardless as to whether registration information from a prior presence in the new area is still retained, and
a registration module adapted for registering the wireless communication device with the network; and
a storage element coupled to the processor and adapted for retaining registration information for a plurality of areas in a default mode of operation, where upon entering a new area, retained registration information allows the wireless communication device to operate based upon the retained registration information from the prior presence in the new area, unless the entry of a new paging group is detected.

12. A wireless communication device in accordance with claim 11 wherein said processor further includes a registration discard module adapted for discarding registrations associated with areas in which the wireless communication device was least recently located, when the number of registrations exceeds the number of registrations being retained.

13. A wireless communication device in accordance with claim 11 wherein said processor further includes a comparison module adapted for comparing the area in which the wireless communication device is located with the area associated with the registration information retained within the storage element, wherein if a registration associated with the current location of the wireless communication device is not retained in the storage element, then producing a control signal adapted for initiating a registration by the registration module.

14. A wireless communication device in accordance with claim 11 wherein one or more of the modules of said processor includes one or more sets of prestored instructions.

15. A wireless communication device in accordance with claim 14 wherein at least some of the one or more sets of prestored instructions are retained in the storage element.

16. A wireless communication device in accordance with claim 11 wherein the processor further includes a packet data connection module adapted for establishing a packet data connection with the network.

17. A wireless communication device in accordance with claim 16 wherein the packet data connection module includes a packet data voice module adapted for supporting voice communication via a packet data connection.

18. A wireless communication device in accordance with claim 16 wherein the packet data connection is part of at least one of a spread spectrum communication system and a code division multiple access (CDMA) system.

19. A wireless communication device in accordance with claim 11 wherein the wireless communication device is a cellular telephone.

* * * * *